United States Patent [19]

Hall

[11] 4,192,076

[45] Mar. 11, 1980

[54] DEVICE FOR HOLDING A SURVEYOR'S INSTRUMENT

[76] Inventor: George W. Hall, 3200 Viking Dr., Sioux City, Iowa 51104

[21] Appl. No.: 953,704

[22] Filed: Oct. 23, 1978

[51] Int. Cl.² .............................................. G01C 15/08
[52] U.S. Cl. ...................................... 33/296; 248/163
[58] Field of Search ..................... 248/163, 165, 431; 33/161, 293, 294, 295, 296, 290, 291, 292

[56] References Cited

U.S. PATENT DOCUMENTS

| 765,871 | 7/1904 | Akins | 33/290 |
|---|---|---|---|
| 1,030,938 | 7/1912 | Stamps | 248/165 |
| 1,976,264 | 10/1934 | Miner et al. | 33/293 |
| 2,802,635 | 8/1957 | Engelbart | 248/163 |
| 3,239,176 | 3/1966 | Johnson | 33/293 |
| 3,704,367 | 11/1972 | Korb | 248/165 |
| 3,857,639 | 12/1974 | Mason | 33/293 |

FOREIGN PATENT DOCUMENTS

| 170911 | 9/1951 | Austria | 248/163 |
|---|---|---|---|
| 1250579 | 12/1960 | France | 33/296 |

*Primary Examiner*—John W. Shepperd
*Attorney, Agent, or Firm*—Zarley, McKee, Thomte, Voorhees & Sease

[57] ABSTRACT

The device of the present invention comprises a tripod having a platform at its top and three legs pivotally connected at their upper ends to the platform member and diverging downwardly and outwardly therefrom. Three connecting members interconnect the lower ends of the tripod legs. A stake holding means is provided on the tripod and includes an upper bracket connected to the tripod platform and a lower bracket connected to one of the connecting members. The upper and lower brackets each have an opening therein, and the openings of the two brackets are vertically registered for receiving a surveyor's stake.

10 Claims, 6 Drawing Figures

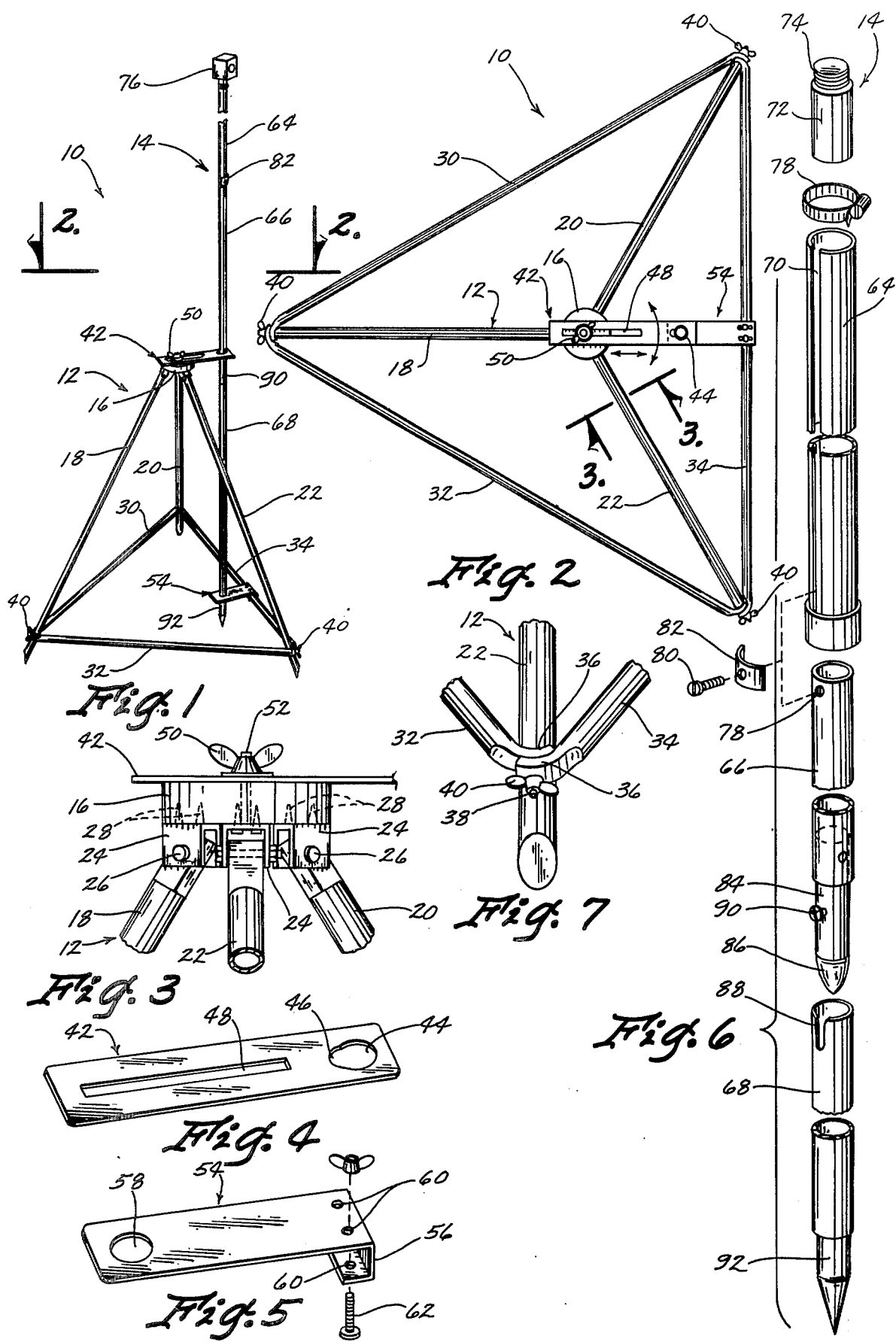

DEVICE FOR HOLDING A SURVEYOR'S INSTRUMENT

BACKGROUND OF THE INVENTION

This invention relates to surveying equipment, and specifically to a device for holding a surveyor's stake or instrument.

Present surveyor's equipment includes electronic sighting devices which are aimed at a target instrument positioned some distance away. The target instrument is usually placed on the upper end of a surveyor's stake and is capable of receiving a signal from the sighting instrument and directing a signal back to the sighting instrument.

When using the above types of surveying equipment it becomes very important that the surveyor's pole or stake be accurately positioned, and that it be held in a stationary position during the takings of the various sightings.

Various holding devices have been used for holding the surveyor's stake or pole, but many of these devices are unstable and fall over easily. They often fall over in response to wind or in response to being bumped or jostled.

Surveying equipment is often used on busy highways where much traffic is encountered, and often the instruments are bumped or jostled or run over by vehicles. Therefore, it is desirable that these holding devices be constructed of materials which can easily be repaired or replaced with a minimum of expense.

SUMMARY OF THE INVENTION

The present invention utilizes a tripod which includes a plurality of connecting members which are detachably secured and which interconnect the lower ends of the tripod legs. The resulting configuration is a tetrahedran. The connecting members greatly enhance the stability of the device.

Brackets are also provided on the tripod for holding a surveyor's stake or pole in a vertical position. The brackets include an upper bracket connected to the platform and a lower bracket connected to one of the connecting members. The two brackets each include an opening therein which is sized to receive the surveyor's stake. The two openings of the two brackets are vertically registered so as to receive the stake.

Therefore, a primary object of the present invention is the provision of an improved device for holding a surveyor's instrument.

A further object of the present invention is the provision of a device for holding a surveyor's instrument which hs improved stability over prior art devices.

A further object of the present invention is the provision of a device for holding a surveyor's instrument which holds the tripod legs in a stationary position and prevents them from moving with respect to one another.

A further object of the present invention is the provision of a device for holding a surveyor's instrument which keeps the center of gravity of the combined tripod and surveyor's stake radially inwardly from the leg ends of the tripod.

A further object of the present invention is the provision of a device for holding a surveyor's instrument which includes brackets for gripping the surveyor's stake at two spaced apart vertical points.

A further object of the present invention is the provision of a device for holding a surveyor's instrument which is easily adjustable so as to permit the plumbing of the surveyor's stake.

A further object of the present invention is the provision of a device for holding a surveyor's instrument which is light and easy to transport.

A further object of the present invention is the provision of a device for holding a surveyor's instrument which is easy to disassemble and repair.

A further object of the present invention is the provision of a surveyor's instrument which includes a surveyor's pole which can be easily and quickly expanded to varying lengths.

A further object of the present invention is the provision of a device for holding a surveyor's instrument which is economical to manufacure, durable in use, and efficient in operation.

BRIEF DESCRIPTION OF FIGURES OF DRAWINGS

FIG. 1 is a perspective view of the present invention.

FIG. 2 is a top plan view taken along line 2—2 of FIG. 1.

FIG. 3 is a sectional view taken along line 3—3 of FIG. 2.

FIG. 4 is a perspective view of the upper bracket used in the present invention.

FIG. 5 is a perspective view of the lower bracket used in the present invention.

FIG. 6 is an exploded perspective view of the expandable pole used with the present invention.

FIG. 7 is an enlarged detail view of the junction between two connecting members and one of the tripod legs.

DETAILED DESCRIPTION OF THE PREFERRED EMBODIMENT

Referring to the drawings, the numeral 10 generally designates the holding device of the present invention. Device 10 includes a tripod 12 and a surveyor's pole or stake 14.

Tripod 12 comprises a platform 16, having three legs 18, 20 and 22 extending downwardly and diverging outwardly therefrom. Each leg is hinged to platform 16 by means of a U-shaped bracket 24 (FIG. 3) having a hinge bolt 26 pivotally connecting the upper end of one of the legs 18, 20, 22 to U-shaped bracket 24. Brackets 24 are operatively secured to the undersurface of platform 16 by means of screws 28. The pivotal connection of legs 18, 20 and 22 to brackets 24 permits the legs to swing radially outwardly from platform 16, and permits the legs to be swung radially inwardly for folding for carrying.

Interconnecting the lower ends of legs 18, 20, 22 are three connecting members 30, 32, 34. Each connecting member is of tube-like construction and includes opposite flattened ends 36 which include apertures therein for receiving a bolt 38 which extends through each of the lower ends of legs 18, 20 and 22. A wing nut 40 is threaded over bolt 38 at each of the lower ends of legs 18, 20 and 22, so as to secure the opposite ends of connecting members 30, 32 and 34 therebetween. The connecting members can easily be removed by loosening wing nut 40 and slipping the flattened ends 36 off of the bolt 38.

An upper mounting bracket 42 (FIG. 4) is constructed of plate like material and includes at one end a circular opening 44 having a lobe 46 adjacent one side thereof. At the other end of bracket 42 is an elongated slot 48 which extends along the longitudinal centerline of bracket 42.

Bracket 42 is mounted to platform 16 by means of a wing nut 50 and a bolt 52 which extends through slot 48. The position of bracket 42 with respect to platform 16 may be adjusted radially by loosening wing nut 50 and sliding bracket 42 radially away from the vertical centerline of the tripod. Slot 48 permits this radial movement, and also permits pivotal movement about bolt 52 for circumferential adjustment of opening 44.

A lower mounting bracket 54 is shown in FIG. 5 and includes a hook portion 56 at one end and a circular opening 58 at the other end. Hook portion 56 is sized to fit over one of the connecting members 30, 32, 34 in the manner shown in FIGS. 1 and 2. A pair of bolt holes 60 are provided in J-shaped hook portion 56 and are adapted to register in corresponding holes located at the approximate midpoint of connecting members 30, 32 and 34 for receiving bolts 62, and thereby securing bracket 54 to the connecting member.

Upper bracket 42 is adjusted to be in a position wherein circular opening 44 is in registered alignment above circular opening 58 of lower bracket 54. Slidably inserted through registered openings 44, 58 is the surveyor's pole or stake 14 which is shown in greater detail in FIG. 6. Pole 14 is comprised generally of three tubular sections 64, 66 and 68. Tube section 64 includes an elongated slot 70 extending along the length thereof. Telescopically received within the upper end of tube section 64 is a stub shaft 72 having a threaded end 74 for receiving a surveyor's instrument 76 (FIG. 1) thereon. A ring clamp 78 embraces the upper end of tube section 64 and is tightened to cause tube section 64 to clamp tightly around the lower end of stub shaft 72, thereby connecting stub shaft 72 to tube section 64.

Tube section 66 is telescopically received within tube section 64, and includes a bolt receiving hole 78 which is aligned with slot 74 of tube section 64. A bolt 80 extends through a clamp 82 and thence through slot 70 into threaded engagement with bolt hole 78. By tightening bolt 80 it is possible to prevent telescopic expansion and retraction of members 64, 66 with respect to one another. Loosening of bolt 80 permits telescopic expansion or retraction of these two members to the desired length.

The lower end of tube section 66 includes a pin 84 which is riveted or otherwise secured therein. Pin 84 includes a sharpened lower point 86 which can be forced into the ground if desired. If a longer extension of tube 14 is required, tube section 68 can be slidably fitted over pin 84. A slot 88 in tube section 68 is registered with a bolt in pin 84 and tightening of bolt 90 secures two tube sections 66, 68 together. A pin 92 similar to pin 84 is mounted within the lower end of tube section 68. Lobe 46 of opening 44 accommodates the head of screw 90 so as to permit stake 14 to slide freely through opening 44 of bracket 42.

The device of the present invention is very sturdy inasmuch as pole 14 is held radially inwardly from the outer radial edges of legs 20, 22 and 24. Similarly, the adjustment of pole 14 may be easily accomplished by loosening wing nut 50 and moving upper bracket 42 until pole 14 is in a vertical plumb position. Then wing nut 50 need only be tightened to secure the pole in a fixed position.

The connecting members 30, 32, 34 provide additional stability to the device and the tendency of the device to tip or move in response to wind is minimal. The pole 14 is grasped at two spaced apart points by upper bracket 42 and lower bracket 54, and this provides increased stability for pole 14 during the surveying operation.

The device may be easily folded merely by loosening the wing nuts at the ends of the three legs, removing the connecting members, and folding the legs into a folded position. The legs and connecting members are constructed of tube like conduits and may easily be replaced in the event of bending or damage. The pole may be telescoped to various lengths depending upon the length needed for the particular surveying operation. Thus, it can be seen that the device accomplishes at least all of its stated objectives.

What is claimed is:

1. A device for holding a surveyor's stake comprising:
    a tripod having a platform member and three legs hingedly connected at their upper ends to said platform member;
    three connecting members interconnecting said lower ends of said legs, each of said connecting members having one of its ends detachably secured adjacent the lower end of one of said legs and the other of its ends detachably secured adjacent the lower end of another of said legs, whereby said connecting members when so secured to said legs hold said legs against pivotal movement of said legs about their hinged connections to said platform member; and
    stake holding means on said tripod for holding said stake against movement with respect to said tripod, said stake holding means comprising an upper bracket and a lower bracket, said upper bracket being operatively mounted to said platform and said lower bracket being operatively connected to one of said connecting members.

2. A device according to claim 1 wherein said stake holding means comprises and upper bracket and a lower bracket, said upper bracket being operatively mounted to said platform and said lower bracket being operatively connected to one of said connecting members.

3. A device according to claim 1 wherein said upper bracket includes an opening therein sized to slidably embrace said surveyor's stake, said lower bracket also having an opening therein similarly sized, said holes upper and lower bracket being vertically aligned.

4. A device according to claim 3 wherein said holes of said upper and lower brackets are positioned radially outwardly from the vertical centerline of said tripod and radially inwardly from said connecting members.

5. A device according to claim 4 wherein said upper bracket is adjustably mounted by upper bracket mounting means to said platform for selective adjustable movement radially and circumferentially with respect to the vertical centerline of said tripod.

6. A device according to claim 5 wherein said stake is slidably inserted into said vertically aligned holes, said stake comprising a plurality of stake sections, one of said stake sections being an upper tube having a second tube telescopically received therein, locking means being provided on said upper tube for selectively locking said upper tube and said second tube at various telescopic positions with respect to one another.

7. A device according to claim 6 wherein said second tube has a pin fixedly mounted within the lower end thereof, said pin having one end protruding downwardly from said lower end of said second tube, a third tube having a tubular upper end telescopically receiving said pin from said second tube, said second and third tubes being of approximately the same size.

8. A device according to claim 5 wherein said upper bracket comprises an elongated member having an elongated slot extending along at least a portion thereof, said upper bracket mounting means comprising a threaded bolt connected to said platform and extending upwardly through said slot, a wing nut being threaded over the upper end of said bolt for selectively holding said upper bracket against movement.

9. A device according to claim 8 wherein said lower bracket comprises a J-shaped member having a hook shaped end sized to hook around said connecting member, bolt means extending through said hook shaped end and said connecting member to rigidly attach said bracket to said connecting member.

10. A device according to claim 9 wherein said lower bracket is attached to said connecting member adjacent the longitudinal midpoint thereof.

* * * * *